United States Patent
Rose et al.

(10) Patent No.: US 7,998,243 B2
(45) Date of Patent: Aug. 16, 2011

(54) METHOD OF PRODUCING STEEL WITH HIGH MANGANESE AND LOW CARBON CONTENT

(75) Inventors: Lutz Rose, Duisburg (DE); Walter Weischedel, Meerbusch (DE)

(73) Assignee: SMS Siemag AG, Duesseldorf (DE)

( * ) Notice: Subject to any disclaimer, the term of this patent is extended or adjusted under 35 U.S.C. 154(b) by 0 days.

(21) Appl. No.: 12/803,451

(22) Filed: Jun. 25, 2010

(65) Prior Publication Data
US 2011/0000339 A1 Jan. 6, 2011

Related U.S. Application Data

(62) Division of application No. 11/661,164, filed on Feb. 21, 2007.

(51) Int. Cl.
*C21C 5/35* (2006.01)
*C21C 7/068* (2006.01)
(52) U.S. Cl. .......................... 75/551; 75/531; 75/10.63
(58) Field of Classification Search ............... 75/10.63, 75/500, 501, 507, 528, 531, 540, 544, 548, 75/551
See application file for complete search history.

(56) References Cited

U.S. PATENT DOCUMENTS
4,808,220 A * 2/1989 Litterscheidt et al. .......... 75/543
5,462,579 A * 10/1995 Narahara et al. ................ 75/624

FOREIGN PATENT DOCUMENTS
JP 63-206446 A1 * 8/1988
* cited by examiner

*Primary Examiner* — George Wyszomierski
*Assistant Examiner* — Mark L Shevin
(74) *Attorney, Agent, or Firm* — Abelman, Frayne & Schwab

(57) ABSTRACT

A method of producing steel (1) with a high manganese and low carbon content on the basis of liquid pig iron (2) or liquid steel (3) and slag-forming constituents (4) with the object of preventing existing drawbacks of process route in vessels other than, e.g., electrical arc furnaces (18). With steel produced with a high manganese and low carbon content, in a process, the carbon component is reduced to about 0.7-0.8% by a combined blowing of oxygen (7) through top lances (8) and underbath nozzles (9) after feeding of liquid ferro-manganese (50 and liquid steel (3*a*) in a FeMn-refining converter (6*a*), wherein a component of a cold end product from premelt is added as cooling means (10), and wherein the carbon component is reduced to about 0.05-0.1% C by a continuous blowing of oxygen (7) through the underbath nozzles.

4 Claims, 2 Drawing Sheets

METHOD OF PRODUCING STEEL WITH HIGH MANGANESE AND LOW CARBON CONTENT

RELATED APPLICATION

This application is a divisional of application Ser. No. 11/661,164 filed Feb. 21, 2007.

BACKGROUND OF THE INVENTION

1. Field of the Invention

The invention relates to a method of producing steel with a high manganese and low carbon content on the basis of liquid pig iron or liquid steel and slag-forming constituents.

2. Description of the Prior Art

Production of steel with a high manganese content in metallurgical plants is carried out mainly on the basis of scrap in electrical arc furnaces (Report at metallurgical Forum, Leoben 2003, authors Gigacher, Doppler, Bernard Krieger). During the production, a manganese carrier such as ferro-alloy is added to the melt. This presents a problem as ferro-manganese (FeMn) with a low carbon content is in about 300 times more expensive than similar products with a high C-content. FeMn with a low carbon content is, however, best suited for the production.

The production of steel with a high manganese content in a vessel other than electrical arc furnace fails because with blowing of oxygen, a large amount of manganese slags as during decarburization of steel, oxygen develops a high affinity to manganese. Up to the present, with the selection of the converter route, the drawback consisted in a high slagging of manganese and a correspondingly low manganese content in steel of about 16-17%.

The production of steel with a high manganese and low carbon content in electrical arc furnaces is connected with several draw backs: in electrical arc furnaces at temperatures up to 3000° C., a high vaporization of manganese takes place. Further, in order to insure a low content of companion elements, a high-quality, expensive scrap is necessary. Besides, use of the expensive ferro-alloys with a low carbon content is necessary.

SUMMARY OF THE INVENTION

The object of the invention, is to eliminate the drawbacks of the production route in vessels other than electrical arc furnaces, and in which steel with a high manganese and low carbon content is to be achieved with the use of pig iron and liquid FeMn-charge.

The stated object is achieved, according to the invention, in that the process is carried out by feeding liquid ferro-manganese with about 6% of C and liquid steel with about 0.1% C, together with a necessary amount of slag-forming constituents, in a FeMn-refining converter. The carbon component is reduced to about 0.7-0.8% by a combined blowing of oxygen through top lances and underbath nozzles, thereafter, a component of a cold end product from premelt is added as cooling means and thereafter, the carbon content is reduced to about 0.05-0.1% C by a continuous blowing of oxygen through the underbath nozzles.

The working of the cooling means and the course of the combustion process of carbon at relatively low temperatures and beneath the bath level prevents evaporation of manganese. The use of FeMn carburizer as a manganese carrier insures an economical route for production of steel with a high manganese content. The manganese content can be increased by about 25-30%. The use of pig iron facilitates meeting of strict requirements to content of copper and other companion elements. The production of steel with a high manganese content with additives is also possible in an integrated steel plant. The addition of tramp elements from scrap that contains, e.g., copper, zinc, tin, molybdenum, tungsten and the like, is not necessary.

Advantageously, a partial pressure is reduced by the combined blowing of oxygen and an oxygen-inert gas mixture through the top lance or through the underbath nozzles.

In order to maintain advantageously, a low temperature, all of the steps of the process is carried out in a temperature range between 1630-1650° C.

A further improvement of the method contemplates adding SiMn and or FeAl into the melt in a ladle furnace for adjusting the analyses.

Thereby, steels such as TWIP-(Twinning Induced Plasticity) or TRIP (Transformation Induced Plasticity)-steel can be produced.

According to a practical embodiment, liquid FeMn75 carburizer in an amount of about 380 kg with 6% C (per ton of steel) and 530 kg of liquid steel with 0.1% C and a necessary amount of slag-forming constituents is fed in a FeMn-refining converter, whereby the melt contains 23.3 kg of carbon that corresponds to a carbon content of C=2.6%. The carbon content is reduced by a combined oxygen blowing over at least one top lance and a plurality of underbath nozzles, and finally, about 150 kg of a cold end product from premelt is continuously added as cooling means and the carbon content is reduced to about C=0.1% by blowing an oxygen-inert gas mixture through the underbath nozzles.

A smelter for producing steel with a high manganese and low carbon content on the basis of liquid pig iron or liquid steel and slag-forming constituents, is so formed that in a material flow, on one hand, a reducing furnace or a blast furnace for pig iron and, on the other hand, a steel-smelting converter for carbon steel or an electrical arc furnace arc furnace are arranged upstream of a FeMn-refining converter and, a ladle furnace adjoins it in a process path.

BRIEF DESCRIPTION OF THE DRAWINGS

The drawings show embodiments of the invention which will be explained in detail below.

In the drawings.

DETAILED DESCRIPTION OF THE PREFERRED EMBODIMENT

Figure 1:
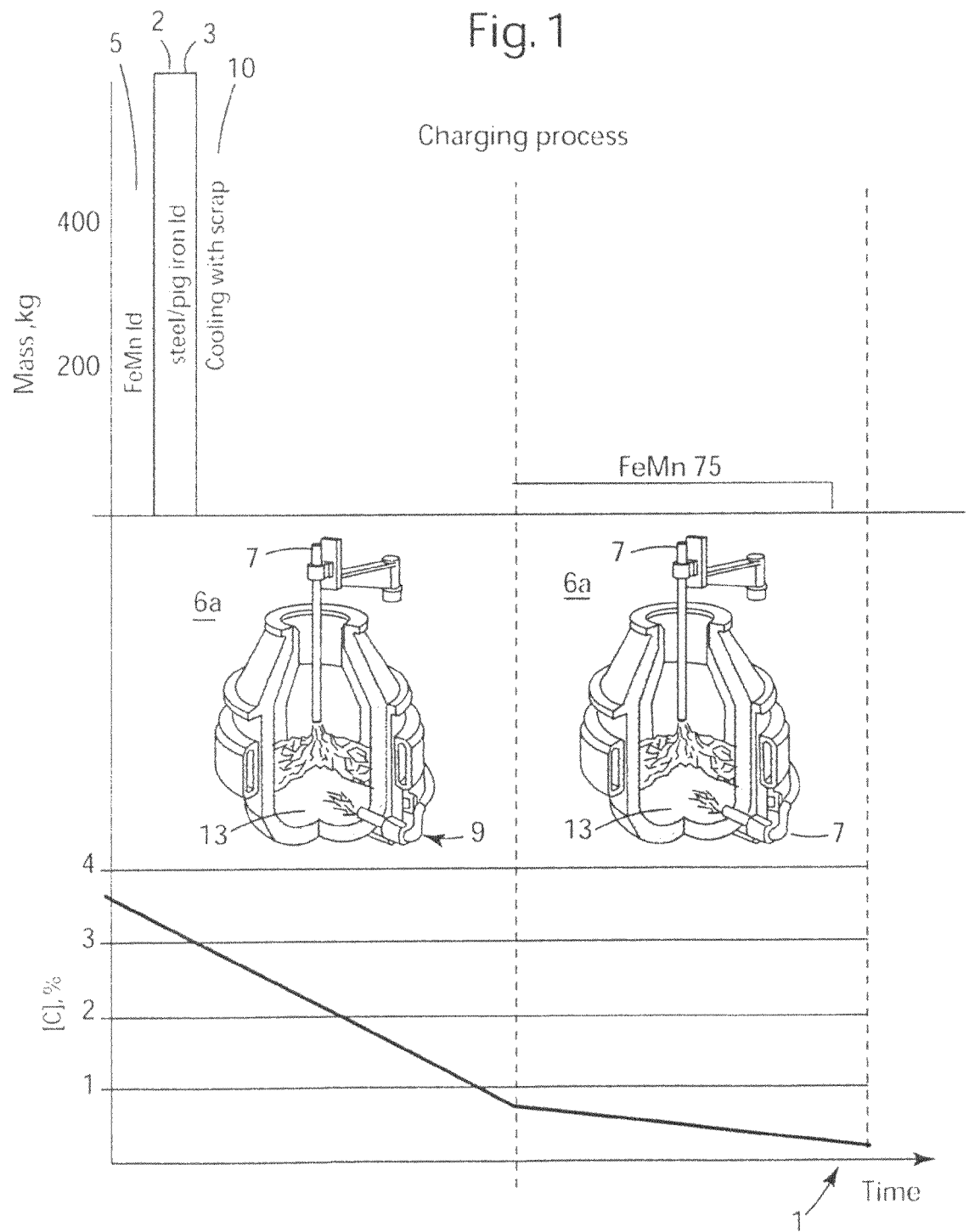
FIG. 1 shows a diagram for a charging process (upper portion) and its course for decarburization process dependent on time (lower portion, and FIG. 2 shows a block diagram with a routine of fed row material in a smelter.
Figure 2:
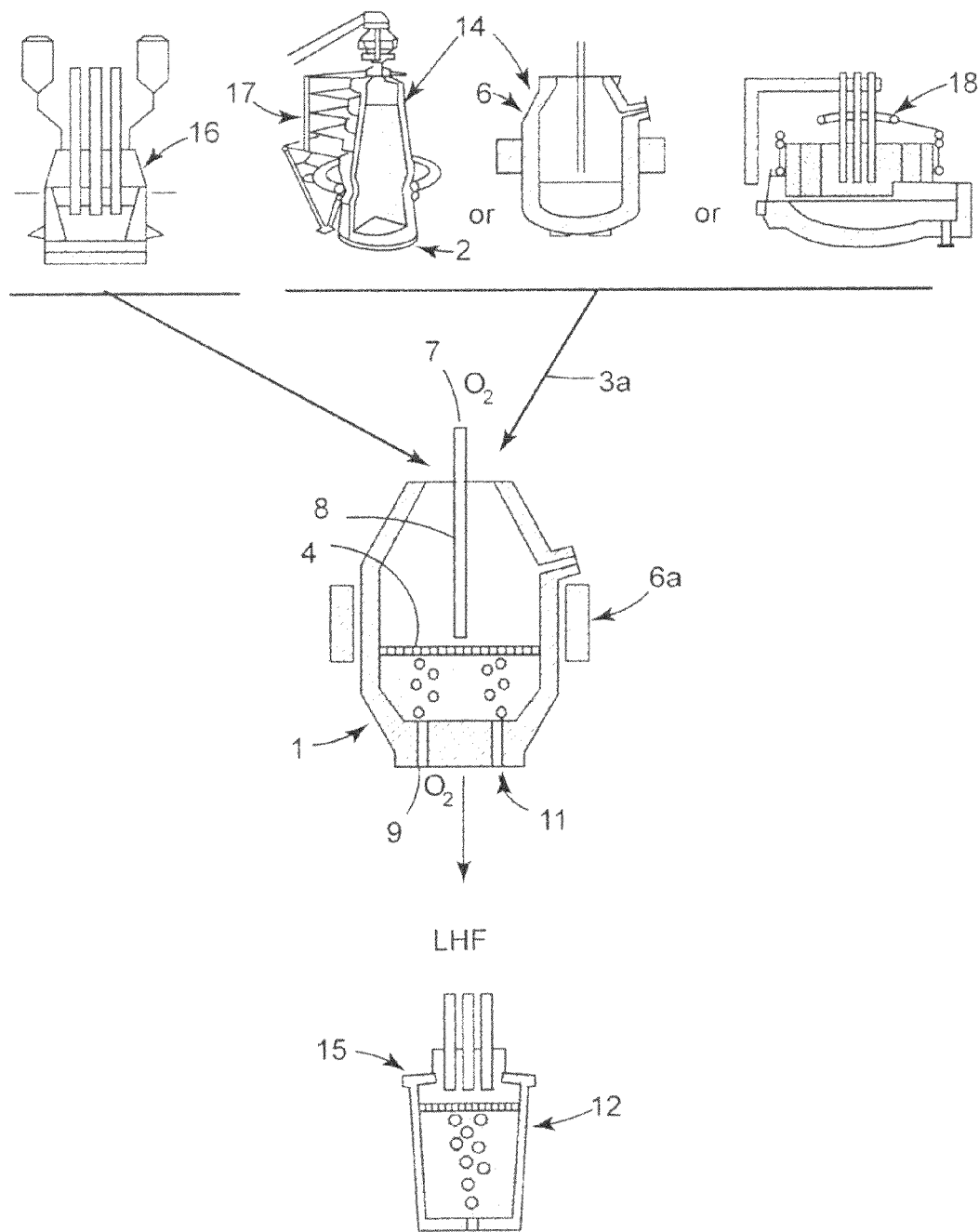

According to FIG. 1, the process of producing steel 1 with a high content of manganese and a low content of carbon works on the basis of liquid pig iron 2 or liquid steel 3 and slag-forming constituents 4 (see the slag layer in FIG. 2). The process is initiated by introduction of liquid ferro-manganese 5 with about 6% C and liquid steel or carbon steel 3a with about 0.1% C into a FeMn-refining converter 6a with a necessary amount of the slag-forming constituents 4.

Thereafter, the carbon component is lowered to about 0.7 to 0.8% C by combined blowing of oxygen 7 with at least one top lance 8 and underbath nozzles 9. Simultaneously, a component of a cold product from a premelt is added as cooling means. In this phase, the carbon component reduction takes place up to 0.05-0.1% C by continuous blowing in of oxygen 7 through underbath nozzles 9.

With a continuous blowing-in of oxygen 7 and an oxygen-inert gas mixture 11 through the underbath nozzles 9 and the top lance 8, the partial pressure of oxygen in the melt can be reduced. All of the steps of the process take place in a (low) temperature range between 1630° C. and 1650° C.

For adjusting the analysis in a ladle furnace, SiMn and/or FeAl are (is) added to the melt 13.

The smelter for producing steel 1 with a high content of manganese and a low content of carbon operates, according to FIG. 2, with pig iron or carbon steel-supply 14, with addition of the slag-forming constituents 4 and companion elements 15 of steel. To this end, a reducing furnace 16 (with submerged electrodes), or a blast furnace 17 for pig iron 2, or a steel-smelting converter 6 for carbon steel 3a, or an electrical arc furnace 18, which are located, upstream, in the material flow, of a FeMn-refining converter 6a, are used. A ladle furnace 12 adjoins the FeMn-refining converter 6a.

According to a practical embodiment of the inventive process, in a first step, a liquid carburizer FeMn 75 in an amount of about 380 kg with 6% C (per ton of steel), 530 kg of liquid steel with 0.1% C and a necessary amount of slag-forming constituents 4 are loaded in the FeMn-refining converter 6a, whereby the melt (13) contains 23.3 kg of carbon, which corresponds to carbon content of C=2.5%. In a second step, the carbon content is reduced to about 0.7% by a combined oxygen blowing with at least one top lance 8 and several underbath nozzles 9. In a third step, about 150 kg (to a ton of steel) of a cold end product from a premelt is continuously added as cooling means 10. In the fourth step, the carbon content is reduced to about 0.1% C by delivering an oxygen-inert gas mixture 11 through the underbath nozzles 9 (the inert gas serves for protection of nozzle and, simultaneously, functions as an agitator).

The adjustment of the analysis (TWIP or TRIP-steel) takes place by addition of light metals (Si, Al, and the like), so that the desired steel 1 with a high manganese content and additives Al and Si can be produced in an integrated steel plant.

What is claimed is:

1. A method of producing steel with high manganese content of 25 to 30% and low carbon content on the basis of liquid pig iron or liquid steel and slag-forming constituents, the method comprising the steps of:

feeding liquid ferro-manganese with about 6% C and liquid steel with about 0.1% C, or liquid pig iron, together with a necessary amount of slag-forming constituents;

in a FeMn-refining converter to form a melt, reducing the carbon content by about 0.7-0.8% C by a combined blowing of oxygen through a top lance and under bath nozzles;

adding scrap as cooling means;

and thereafter, reducing the carbon content to about 0.05-0.1% C by a continuous blowing of oxygen through underbath nozzles.

2. A method according to claim 1, comprising the step of reducing partial pressure of oxygen in the melt by combined blowing of oxygen and an oxygen-inert gas mixture through the top lance or through the underbath nozzles.

3. A method according to claim 1, wherein all of the process steps are carried out in a temperature range between 1630-1650° C.

4. A method according to claim 1, comprising the step of adding SiMn and/or FeAl to the melt in a ladle furnace for adjusting an analysis.

* * * * *